| United States Patent [19] | [11] 3,853,895 |
| --- | --- |
| Lamm et al. | [45] Dec. 10, 1974 |

[54] CERTAIN SUBSTITUTED 2,6-DIAMINO-4-METHYL-NICOTINONITRILES THE CORRESPONDING NICOTINAMIDES AND DERIVATIVES THEREOF

[75] Inventors: Gunther Lamm; Johannes Dehnert, both of Ludwigshafen, Germany

[73] Assignee: Badische Anilin & Soda-Fabrik Aktiengesellschaft, Ludwigshafen, Rhine, Germany

[22] Filed: Jan. 31, 1973

[21] Appl. No.: 328,459

[52] U.S. Cl........ 260/294.9, 260/156, 260/295.5 A, 260/295.5 B, 260/295.5 T
[51] Int. Cl............................................. C07d 31/46
[58] Field of Search... 260/294.9, 295.5 A, 295.5 B, 260/295.5 T

[56] References Cited
UNITED STATES PATENTS
3,433,795  3/1969  Hyden et al.................. 260/295.5 T
3,664,996  5/1972  Berrie et al.................. 260/295.5 A

OTHER PUBLICATIONS

Karrer, Organic Chemistry, 4th English Edition, Page 928, Elsevier Pub. Co., (NY), 1950.

Chemical and Engineering News, page 18, Apr. 3, 1972.

*Primary Examiner*—Alan L. Rotman
*Attorney, Agent, or Firm*—Johnston, Keil Thompson & Shurtleff

[57] ABSTRACT

2,3,6- and preferably also 4-substituted pyridine derivatives bearing the radical of ammonia or a primary amine in the 2- and 6-positions. The compounds are eminently suitable as coupling components for the production of azo dyes, the coupling taking place in the 5-position.

6 Claims, No Drawings

CERTAIN SUBSTITUTED 2,6-DIAMINO-4-METHYL-NICOTINONITRILES THE CORRESPONDING NICOTINAMIDES AND DERIVATIVES THEREOF

This invention relates to compounds of the formula:

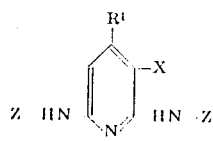

where
R$^1$ is hydrogen, alkyl of one to seven carbon atoms or phenyl, the radicals Z independently of one another mean hydrogen or an unsubstituted or substituted aliphatic, cycloaliphatic, araliphatic or aromatic radical and
X is cyano or carbamoyl.

More particularly, the invention relates to compounds of the formula (Ia):

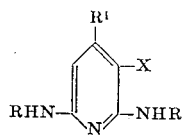 (Ia)

in which
R$^1$ is hydrogen, alkyl of one to seven carbon atoms or phenyl,
X is carbamoyl or cyano and the radicals
R independently of one another are unsubstituted or substituted aliphatic, cycloaliphatic, araliphatic or aromatic radicals and one of the radicals R may be hydrogen and at least one of the radicals R contains an oxygen atom.

Examples of alkyl radicals R$^1$ are ethyl, n-propyl, isopropyl, butyl, pentyl, α-ethylpentyl and preferably methyl.

Examples of radicals Z or R are alkyl of one to eight carbon atoms which may be interrupted by oxyten atoms and which may bear hydroxy, alkoxy, cyano, cycloalkoxy, aralkoxy or aroxy as substituents, cycloalkyl and polycycloalkyl which may bear hydroxy, chloro, hydroxyalkyl, chloroalkyl or alkyl as substituents, aralkyl of seven to fifteen carbon atoms, phenyl which may bear chloro, hydroxy, alkoxy, alkyl, hydroxyalkoxy or hyroxyalkyl as substituents, or alkenyl, pyrrolidonylalkyl or carboxyalkyl.

Examples of individual radicals Z or R are:

1. unsubstituted or substituted alkyl:
$CH_3$, $C_2H_5$, n-$C_3H_7$, i-$C_3H_7$, n-$C_4H_9$, i-$C_4H_9$, $C_6H_{13}$,

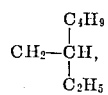

$CH_2CH_2OH$, $(CH_2)_3OH$,

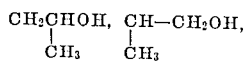

$(CH_2)_4OH$, $(CH_2)_6OH$,

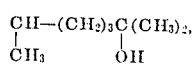

$(CH_2)_2O(CH_2)_2OH$, $(CH_2)_3O(CH_2)_4OH$, $(CH_2)_3OC_2H_4OH$, $(CH_2)_3OC_2H_4OCH_3$, $(CH_2)_3OC_2H_4OC_2H_5$, $(CH_2)_3OC_2H_4OCH(CH_3)_2$, $(CH_2)_3OC_2H_4OC_4H_9$, $(CH_2)_3OC_2H_4OCH_2C_6H_5$, $(CH_2)_3OC_2H_4OC_2H_4C_6H_5$,

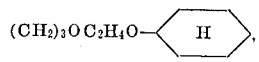

$(CH_2)_3OC_2H_4OC_6H_5$,

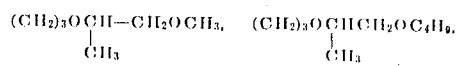

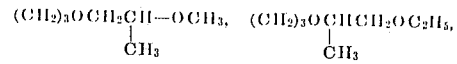

corresponding radicals in which the groupings

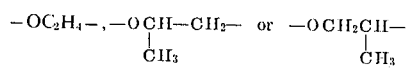

are present twice, three times or four times, $CH_2CH_2OCH_3$, $CH_2CH_2OC_2H_5$, $CH_2CH_2OC_3H_7$, $CH_2CH_2OC_4H_9$, $CH_2CH_2OC_6H_5$, $(CH_2)_3OCH_3$, $(CH_2)_3OC_2H_5$, $(CH_2)_3OC_3H_7$, $(CH_2)_3OC_4H_9$,

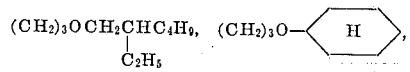

$(CH_2)_3OCH_2C_6H_5$, $(CH_2)_3OC_2H_4C_6H_5$, $(CH_2)_3OC_6H_5$,

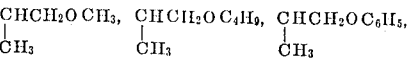
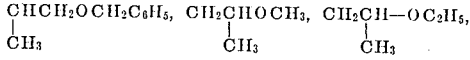
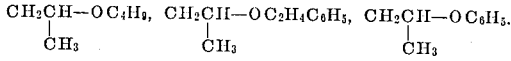
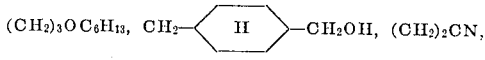
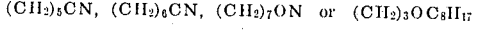

and $C_6H_4CH_3$ instead of $C_6H_5$ 2. unsubstituted or substituted cycloalkyl or polycycloalkyl:

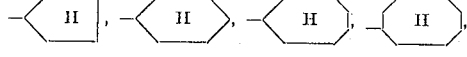
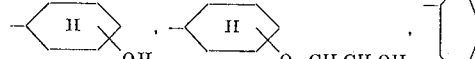
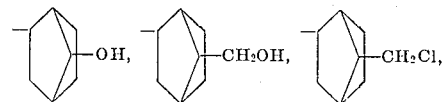
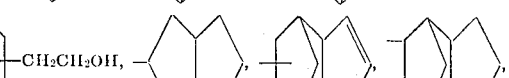

3. aralkyl:

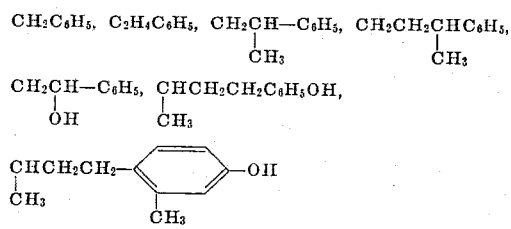

and $C_6H_4CH_3$ instead of $C_6H_5$.

4. unsubstituted or substituted phenyl:

$C_6H_5$, $C_6H_4CH_3$, $C_6H_3(CH_3)_2$, $C_6H_4OCH_3$, $C_6H_4OC_2H_5$, $C_6H_4OH$, $C_6H_4OCH_2CH_2OH$ or $C_6H_4Cl$,

5. $CH_2CH=CH_2$, $(CH_2)_2COOH$, $(CH_2)_5COOH$ and

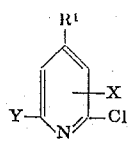

in which $n$ is 2, 3, 4 or 6.

For the production of compounds of formula (I), compounds of formula (II):

in which
Y is chloro or a radical of the formula NHR, and
X, R and $R^1$ have the meanings given above may be reacted with an amine of the formula:

$$R—NH_2.$$

Reaction conditions which affect the exchange of the chlorine atom(s) include the temperature, the amine component, the molar ratio of the reactants and any diluent or solvent or acid-binding agent used. Amines of low boiling point may of course be reacted under superatmospheric pressure. The reaction with the amine is conveniently carried out at elevated temperature, a temperature of from about 0° to 110°C being adequate for the exchange of the first chlorine atom depending on the basicity of the amine, while temperatures in the range from about 60° to 180°C being advantageous for exchange of the second chlorine atom.

Amines of high basicity react more rapidly than those of low basicity; when exchanging the second chlorine atom it is advantageous to use an excess of amine (more than 10 percent), whereas the first chlorine atom reacts immediately with a molar amount of amine. Examples of suitable diluents or solvents which may be added are alcohols such as methanol, ethanol or isopropanol, glycols and glycol ethers such as methyl glycol, ethyl glycol or butyl glycol, hydrocarbons and halohydrocarbons such as benzene, toluene, ethylene chloride, chloroform, trichloroethylene or chlorobenzene, and also acetone, tetrahydrofuran, dimethylformamide, N-methylpyrrolidone or dimethylsulphoxide.

The presence of water does not cause any disturbance.

The addition of acid-binding agents is advantageous because then the total amount of amine to be reacted is available for the exchange. Substances which do not themselves react with the chloropyridine derivatives are suitable as acid-binding agents; for example tertiary amines such as triethylamine, tributylamine, triethanolamine, ethyldiisopropylamine, caustic soda solution, sodium carbonate, magnesium oxide or calcium carbonate are suitable. In the case of inexpensive amines, an excess of the amine to be reacted may also serve as acid-binding agent.

Compounds of the formula (Ib):

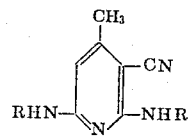

in which R has the meanings given above are of particular industrial significance.

Examples of preferred radicals R containing oxygen are:

$CH_2CH_2OH$, $CH_2CH_2CH_2OH$,

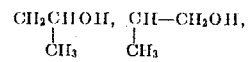

$(CH_2)_3O(CH_2)_2OH$,    $(CH_2)_3O(CH_2)_4OH$,
$(CH_2)_3O(CH_2)_6OH$,    $(CH_2)_4OH$,    $(CH_2)_6OH$,
$(CH_2)_2O(CH_2)_2OH$,

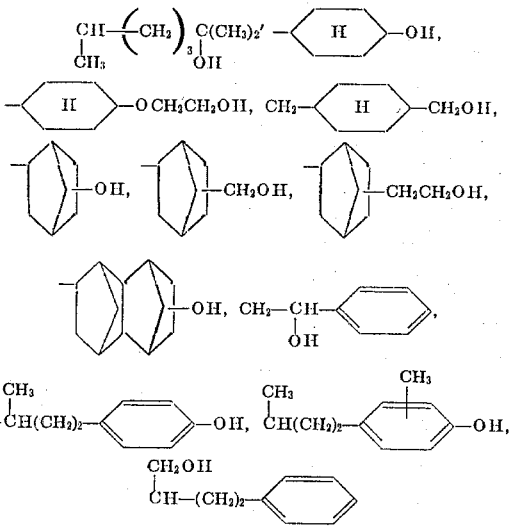

$CH_2CH_2OCH_3$,    $CH_2CH_2OC_2H_5$,    $CH_2CH_2OC_4H_9$,
$(CH_2)_3OCH_3$,    $(CH_2)_3OC_2H_5$,    $(CH_2)_3OC_3H_7$,
$(CH_2)_3OC_4H_9$, $(CH_2)_3OC_6H_{13}$, $(CH_2)_3OC_8H_{17}$,

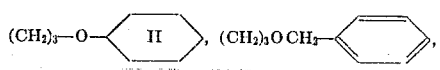

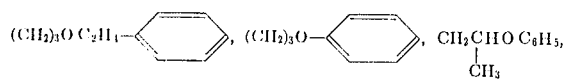

(CH$_2$)$_3$OC$_2$H$_4$OCH$_3$, (CH$_2$)$_3$OC$_2$H$_4$OC$_4$H$_9$,

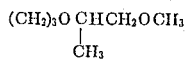

and (CH$_2$)$_3$OC$_2$H$_4$OC$_6$H$_5$.

Examples of preferred oxygen-free radicals which are preferably used in combination with an oxygen-containing radical R are besides H:

C$_2$H$_5$, C$_3$H$_7$, C$_4$H$_9$,

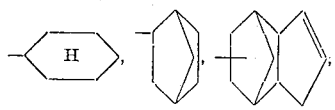

CH$_2$C$_6$H$_5$, C$_2$H$_4$C$_6$H$_5$, C$_3$H$_7$C$_6$H$_5$,

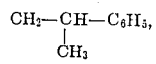

C$_6$H$_5$, C$_6$H$_4$CH$_3$, C$_6$H$_4$OCH$_3$.

The new coupling components are outstandingly suitable for the production of azo dyes by reaction with diazotized amines. The dyes which can be obtained in this way are distinguished by excellent fastness properties and by unusual brightness for azo dyes.

The following Examples illustrate the invention. Parts and percentages referred to are by weight unless otherwise stated.

EXAMPLE 1

187 parts of 2,6-dichloro-3-cyano-4-methylpyridine is suspended in 500 parts by volume of methanol. 80 parts of 2-hydroxyethylamine is then added at 40° to 45°C followed by 100 parts of triethylamine. The mixture is stirred for five to six hours at 45° to 50°C, about 250 parts by volume of methanol is distilled off and the residue is diluted with 1000 parts by volume of water. After acidification with 50 parts of concentrated hydrochloric acid, the whole is stirred for 1 hour, the deposited precipitate is filtered off, washed with water until neutral and dried. About 210 parts of a colorless powder of the formula:

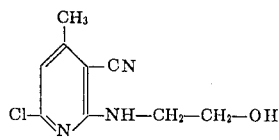

is obtained. The powder contains a minor amount of a product of the formula:

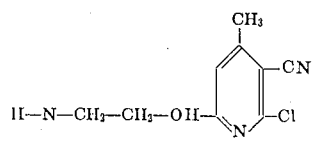

The mixture melts at 115° to 120°C.

125 parts of this powder is stirred with 300 parts by volume of methoxyethylamine for six hours under reflux.

Excess methoxyethylamine is then extensively distilled off so that the temperature may rise to 130°C and the whole is then diluted with 500 parts of water. The mixture is stirred for one hour at 0° to 10°C and the deposited precipitate is filtered off, washed with water and dried. The main product has the formula:

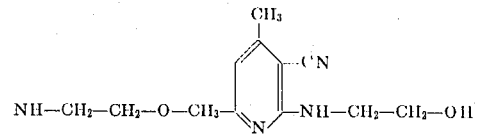

and there is a minor amount of a product having the formula:

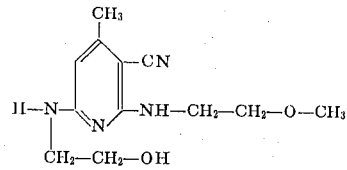

The product is colorless and melts at 75° to 78°C.

EXAMPLE 2

A suspension of 50 parts by volume of methanol, 22 parts of norbornylamine, 37 parts of 2,6-dichloro-3-cyano-4-methylpyridine and 25 parts of triethylamine is stirred for six hours at 40° to 50°C. Then about 200 parts by volume of ice-water is added, the whole acidified to pH 1, and the precipitated product of the formula

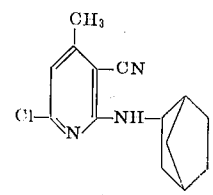

(which still contains a small proportion of 2-chloro-3-cyano-4-methyl-6-norbornylaminopyridine isomers) is filtered off, washed with water and dried. About 45 parts of a colorless powder is obtained which melts at 110° to 112°C.

45 parts of the moist powder is heated at 130°C to 140°C with 50 parts of the amine of the formula:

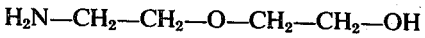

H$_2$N—CH$_2$—CH$_2$—O—CH$_2$—CH$_2$—OH the water being allowed to evaporate. After stirring for 5 hours at 130° to 140°C the reaction is completed. The whole is allowed to cool and is acidified with 130 parts by volume of acetic acid. A solution of the coupling component mixture of the formulae:

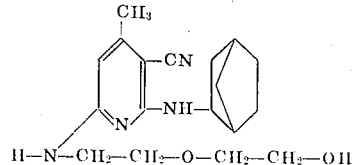

(I)

and

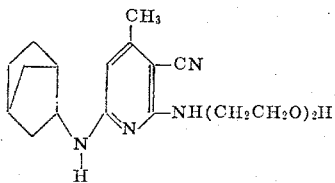

(II)

is obtained, the amount of the product of formula (II) being small.

When the mixture thus obtained is coupled with p-nitroaniline a dye is obtained which dissolves in dimethylformamide to give an orange solution.

EXAMPLE 3

A mixture of 300 parts by volume of N-methylpyrrolidone, 150 parts of 2,6-dichloro-3-cyano-4-methylpyridine, 115 parts of p-anisidine and 90 parts of triethylamine is stirred for from six to 7 hours at 70°C. It is then poured while stirring onto 1500 parts of ice-water and acidified with hydrochloric acid to pH 1. About 220 parts of a colorless product of the formula:

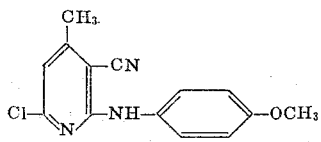

is obtained which is isolated by filtration, washing with water and drying. The powder contains a minor amount of a product of the formula:

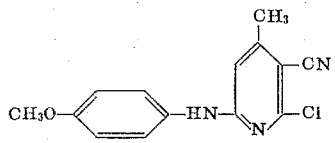

The mixture melts at 147° to 150°C.

EXAMPLE 4

50 parts of 2,6-dichloro-3-carbamoyl-4-methylpyridine is stirred with 75 parts of propanolamine-1,3 for 10 hours at 90°C. The mixture is precipitated with water and acidified to pH < O. The insoluble residue is filtered off, washed with water and dried. The colourless powder melts at 210°C and probably has the formula (I):

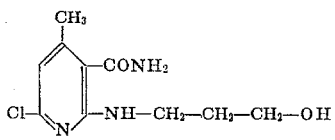

(I)

The filtrate has caustic soda solution added to it until the pH is from 5 to 6. A crystalline precipitate is thrown down which probably has the formula (II)

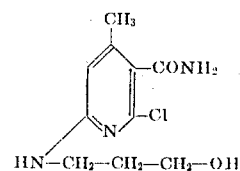

This is filtered off, washed with water and dried. The product (II) thus obtained also contains traces of the product of the formula (I) and melts at 150° to 160°C.

If the reaction mixture is precipitated at pH from 6 to 7, a mixture of the two isomers is obtained which has a melting point of about 143°C.

When 2,6-dichloro-3-carbamoyl-4-methylpyridine is treated analogously to the method described in Example 4, mixtures of substituted 2-aminopyridines and 6-aminopyridines are obtained, the amount of 2-amino-3-carbamoyl-4-methyl-6-chloropyridine derivatives being only slightly greater than that of the 6-aminopyridine isomers in question.

The physical properties given in Table 1 relate to mixtures.

TABLE 1

| Number | $R^1$ | Melting point, °C. |
|---|---|---|
| 5 | —⟨C6H4⟩—CH3 | 115-190 |
| 6 | —(CH2)3O—C2H5 | 120 |
| 7 | —C4H9(n) | 121-122 |
| 8 | —C6H13(n) | 89-90 |
| 9 | —CH2CH-CH3 \| OH | 140-145 |
| 10 | —⟨C6H4⟩—OCH3 | 180-190 |
| 11 | (CH2)3OCH3 | 105 |
| 12 | C3H7(n) | 124 |
| 13 | CH2CH2OH | 130 |
| 14 | (CH2CH2O)2H | 110 |
| 15 | CH3 | >150 |
| 16 | C2H5 | 143 |
| 17 | —⟨C6H4⟩—Cl | 190 |

When 2,6-dichloro-3-cyano-4-methylpyridine is treated by a method analogous to those described in Examples 1 to 3, there are obtained (by exchange of one chlorine atom) mixtures of 2-amino-3-cyano-4-methyl-6-chloropyridine and 2-chloro-3-cyano-4-methyl-6-aminopyridine derivatives, the proportion of the 2-chloro-3-cyano-4-methyl-6-amino isomers being clearly less.

TABLE 2

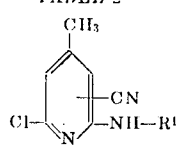

| Number | R¹ | Melting point, °C. |
|---|---|---|
| 18 | (CH₂)₅COONa | 85-91 |
| 19 | (CH₂)₅—CH₃ | 40-47 |
| 20 | (CH₂CH₂O)₂H | 79-83 |
| 21 | (CH₂)₂OCH₃ | 90-100 |
| 22 | C₄H₉(n) | 50-60 |
| 23 | C₃H₇(i) | 95-105 |
| 24 | (CH₂)₃OCH₃ | 75-85 |
| 25 | CH₂CH—C₄H₉(n) <br> \|<br>C₂H₅ | (¹) |
| 26 | (CH₂)₃OH | 110-114 |
| 27 | (CH₂)₂OH | 125 |
| 28 | —C₆H₄—CH₃ | 145-154 |
| 29 | CH₂—C₆H₅ | 147-149 |
| 30 | H | 225-230 |
| 31 | cyclohexyl-H | 165-175 |
| 32 | —C₆H₄—N(CH₂CH₂OH)₂ | 103-105 |
| 33 | CH(CH₃)(CH₂)₃C(CH₃)₂OH | Tar |
| 34 | (CH₂)₂N-pyrrolidone | 103 |
| 35 | cyclooctyl | 90-92 |
| 36 | —(CH₂)₃O—CH₂C₆H₅ | (²) |
| 37 | —C₆H₄—CH₃ (o) | 105-110 |
| 38 | —C₆H₄—CH₃ (m) | 170-185 |
| 39 | —C₆H₄—OCH₃ | 147 |
| 40 | —C₆H₃(CH₃)₂ | 120-128 |
| 41 | —C₆H₄—OCH₃ | 170 |
| 42 | CH₂CH—C₄H₉(n)<br>\|<br>C₂H₅ | 107-110 |
| 43 | —CH₂CH₂—CH—C₆H₅<br>\|<br>CH₃ | (³) |
| 44 | —C₆H₄—OH | 185 |
| 45 | CH₂CH₂COOH | 170 |
| 46 | —C₁₄H₂₉ | 62 |
| 47 | —C₆H₅ | 130-140 |
| 48 | —C₆H₄—OH | 160 |
| 49 | —CH₃ | 140 |
| 50 | —CH₂—CH—OH<br>\|<br>CH₃ | 80 |
| 51 | (CH₂)₃O—(CH₂)₂OH | 75-80 |
| 52 | (CH₂)₃O—C₃H₇(i) | Oil |
| 53 | CH₂CH₂—C₆H₅ | 118-123 |
| 54 | (CH₂)₃O—C₂H₄O—C₆H₅ | Oil |
| 55 | —C₆H₄—Cl | 172 |
| 56 | —C₆H₄—OCH₂CH₂OH | Oil |
| 57 | —CH₂CH—C₆H₅<br>\|<br>OH | 115 |

¹ Greasy product.
² Tar becoming solid on prolonged standing.
³ Viscous oil.

When the products set out in Tables 1 and 2 are treated with aliphatic or aromatic amines at temperatures above 100° or 80°C respectively, the corresponding coupling products are obtained.

In the case of pyridine derivatives which contain a carbamoyl group the reaction has to be carried out however at the lowest possible temperature because otherwise hydrolysis and/or decarboxylation of the —CONH₂ group may take place.

TABLE 3

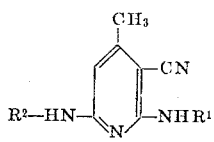

| Number | R¹ | R² | Melting point, °C. |
|---|---|---|---|
| 58 | CH₂CH₂OH | CH₃ | 125-130. |
| 59 | CH₂CH₂OH | (CH₂)₃OH | 47-50. |
| 60 | CH₂CH₂OH | (CH₂)₃OCH₃ | 104-105. |
| 61 | CH₂CH₂OH | CH₂CH₂OH | 156. |
| 62 | (CH₂)₃OH | CH₃ | 215 (hydrochloride). |
| 63 | ⌬—OH | (CH₂)₃OH | 220-223. |
| 64 | (CH₂)₃O(CH₂)₄OH | H | Viscous oil. |
| 65 | (CH₂)₃O(CH₂)₄OH | (CH₂)₃OH | Do. |
| 66 | (CH₂)₃O(CH₂)₄OH | (CH₂)₃OCH₃ | Do. |
| 67 | (CH₂)₃O(CH₂)₄OH | (CH₂)₂OCH₃ | Do. |
| 68 | (CH₂)₃O(CH₂)₆OH | (CH₂)₂OCH₃ | Do. |
| 69 | (CH₂)₃O(CH₂)₆OH | (CH₂)₃OCH₃ | Do. |
| 70 | (CH₂)₃O(CH₂)₆OH | (CH₂)₃OH | Do. |
| 71 | (CH₂)₃O(CH₂)₆OH | (CH₂)₃OH | Do. |
| 72 | CH₂CH₂OCH₃ | CH₂CH₂OCH₃ | 75-76. |
| 73 | CH₂CH₂OCH₃ | CH₂CH₂OH | 108-111. |
| 74 | CH₂CH₂OCH₃ | C₆H₁₃(n) | Oil which has green fluorescence. |
| 75 | CH₂CH₂OCH₃ | —H | 108. |
| 76 | (CH₂)₃—O—CH₃ | —H | 95-98. |
| 77 | (CH₂)₃OH | (CH₂)₃OH | 84-87. |
| 78 | ⌬—OCH₃ | —H | 215-220. |
| 79 | Same as above | CH₂CH₂OH | 137. |
| 80 | do | —CH₂CH₂O—CH₂CH₂OH | 125-130. |
| 81 | ⌬—CH₃ | —(CH₂)₃OH | 170. |
| 82 | Same as above | (CH₂CH₂O)₂H | 175-180. |
| 83 | ⌬(CH₃) | (CH₂)₃OH | 169-170. |
| 84 | ⌬—CH₃ | CH₂CH₂OH | 155-158. |
| 85 | C₆H₅ | CH₂CH₂CH₂OH | 150 (hydrochloride). |
| 86 | ⌬—Cl | CH₂CH₂OH | 173. |
| 87 | ⌬ | CH₂CH₂OH | 136-140. |
| 88 | Same as above | —CH₂CH₂OCH₃ | 134-138. |
| 89 | CH₂—⌬ | —CH₂CH₂OH | 90-95 esterified with acetic acid. |
| 90 | Same as above | CH₂CH₂OCH₃ | 105. |
| 91 | CH₂CH₂—C₆H₅ | CH₂CH₂OCH₃ | 60. |
| 92 | CH₂CH₂—C₆H₅ | CH₂CH₂OH | 167-170. |
| 93 | C₄H₉(n) | CH₂CH₂OH | Oil having green fluorescence. |
| 94 | C₄H₉(n) | CH₂CH₂OCH₂CH₂OH | Do. |
| 95 | C₂H₅ | CH₂CH₂OCH₂CH₂OH | Do. |
| 96 | CH₂CH₂OC₂H₅ | CH₂CH₂OCH₂CH₂OH | Do. |
| 97 | (CH₂)₅CH₃ | CH₂CH₂OCH₂CH₂OH | Do. |
| 98 | (CH₂)₃—OCH₂CH(CH₃)₂ | CH₂CH₂OCH₂CH₂OH | Do. |
| 99 | H | (CH₂)₃—O—(CH₂)₄OH | Viscous oil. |
| 100 | H | (CH₂)₃—O—(CH₂)₆OH | Do. |
| 101 | H | (CH₂)₃—O—(CH₂)₂OH | Do. |
| 102 | H | (CH₂)₃—O—CH₂—C₆H₅ | Do. |
| 103 | H | (CH₂)₃—O—CH₂CH₂OC₆H₅ | Do. |
| 104 | H | (CH₂)₃—O—CH₂CH₂—C₆H₅ | Do. |
| 105 | H | (CH₂)₃—O—CH₂CH₂—OCH₃ | Do. |
| 106 | H | (CH₂)₃—O—CHCH₂—OCH₃<br>                                  CH₃ | Do. |
| 107 | H | (CH₂)₃—O—CH₂CH₂O—C₄H₉ | Do. |
| 108 | H | (CH₂)₃OH—CH₂CH₂O—⌬—CH₃ | Do. |
| 109 | H | —CH(CH₂)₃C(CH₃)₂<br>    CH₃      OH | Do. |
| 110 | H | —CH₂—CH—C₆H₅<br>         OH | Do. |

TABLE 3 — Continued

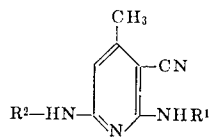

| Number | R¹ | R² | Melting point, °C. |
|---|---|---|---|
| 111 | H | $(CH_2)_3O(CH_2CH_2O)_2CH_3$ | Viscous oil. |
| 112 | H | $(CH_2)_4O(CH_2CH_2O)_2CH_3$ with $CH_3$ branch | Do. |
| 113 | $CH_3$-CH$(CH_2)_2$-C$_6$H$_4$-OH | H | Do. |
| 114 | H | $(CH_2)_3O(CH_2)_2OH$ | Do. |
| 115 | H | $(CH_2)_3O(CH_2)_4OH$ | Do. |
| 116 | H | $(CH_2)_3O-(CH_2)_6OH$ | Do. |
| 117 | H | $(CH_2)_6OH$ | Do. |
| 118 | H | $(CH_2)_3-O-C_2H_4-O-C_3H_7$ | Do. |

| Number | R¹ | R² | Shade on coupling with $O_2N-C_6H_4-N=N^\oplus$ |
|---|---|---|---|
| 119 | $(CH_2)_3O-C_6H_5$ | $-CH_2CH_2OH$ | Orange. |
| 120 | $(CH_2)_3O-C_6H_5$ | $-CH_2CH_2CH_2OH$ | Do. |
| 121 | $(CH_2)_3O-C_6H_5$ | $-CH_2CH_2OCH_2CH_2OH$ | Do. |
| 122 | $(CH_2)_3OCH_2C_6H_5$ | $-CH_2CH_2OCH_2CH_2OH$ | Do. |
| 123 | $(CH_2)_3OCH_2C_6H_5$ | $(CH_2)_3OH$ | Do. |
| 124 | $(CH_2)_3OCH_2C_6H_5$ | $CH_2CH_2OH$ | Do. |
| 125 | $CH_2CHOC_6H_5$ with $CH_3$ | $CH_2CH_2OH$ | Do. |
| 126 | $CH_2CHOC_6H_5$ with $CH_3$ | $(CH_2)_3OH$ | Do. |
| 127 | $(CH_2)_3O-CH_2CH_2C_6H_5$ | $-CH_2CH_2OH$ | Do. |
| 128 | $(CH_2)_3O-CH_2CH_2C_6H_5$ | $(CH_2)_3OH$ | Do. |
| 129 | $(CH_2)_3OCH_2CH_2OC_6H_5$ | $(CH_2)_3OH$ | Do. |
| 130 | $(CH_2)_3OCH_2CH_2OC_6H_5$ | $CH_2CH_2OH$ | Do. |
| 131 | $(CH_2)_3OCH_2CH_2OC_6H_5$ | $-CH_2CH_2OCH_3$ | Do. |
| 132 | $(CH_2)_3OCH_2CH_2OC_6H_5$ | $-CH_2CH_2CH_2OCH_3$ | Do. |
| 133 | $CH_2-C_6H_4-CH_2OH$ | $-CH_2CH_2OH$ | Do. |
| 134 | Same as above | $-(CH_2)_3OH$ | Do. |
| 135 | do | $(CH_2CH_2O)_2H$ | Do. |
| 136 | $-(CH_2)_3OCHCH_2O-C_6H_5$ with $CH_3$ | $-CH_2CH_2OH$ | Do. |
| 137 | $-(CH_2)_3OCHCH_2O-C_6H_5$ with $CH_3$ | $-(CH_2)_3OH$ | Do. |
| 138 | $CH_3$-CH$(CH_2)_2$-C$_6$H$_4$-OH | $-CH_2CH_2OH$ | Do. |
| 139 | Same as above | $-(CH_2)_3OH$ | Do. |
| 140 | do | $-(CH_2CH_2O)_2H$ | Do. |

| Number | R¹ | R² | Melting point, °C. |
|---|---|---|---|
| 141 | $-CH_2-CH(OH)-C_6H_5$ | $-CH(C_2H_5)-CH_2OH$ | Viscous oil. |
| 142 | $-CH_2-CH(OH)-C_6H_5$ | $-(CH_2)_3OH$ | Do. |
| 143 | $-CH_2-CH(OH)-C_6H_5$ | $-(CH_2CH_2O)_2H$ | Do. |

TABLE 3—Continued

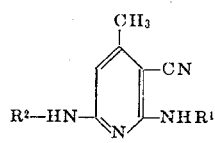

| Number | R¹ | R² | Melting point, °C. |
|---|---|---|---|
| 144 | —CH₂—CH(OH)—C₆H₅ | —(CH₂)₂OCH₃ | Viscous oil. |
| 145 | —CH₂CH(OH)—C₆H₅ | —(CH₂)₃OCH₃ | Do. |
| 146 | —CH₂—CH(CH₃)—OH | —CH₂—CH(OH)—C₆H₅ | Do. |
| 147 | (CH₂)₆OH | —CH₂—CH(OH)—C₆H₅ | Do. |
| 148 | (CH₂)₃O—CH(CH₃)CH₂OCH₃ | —CH₂—CH(OH)—C₆H₅ | Do. |
| 149 | (CH₂CH₂O)₂H | —CH₂—CH(OH)—C₆H₅ | Do. |
| 150 | —CH(CH₃)(CH₂)₃C(CH₃)₂OH | —CH(CH₃)(CH₂)₃C(CH₃)₂OH | Do. |
| 151 | —(CH₂)₃O—(CH₂)₂OH | —(CH₂)₃O(CH₂)₂OH | Do. |
| 152 | —(CH₂)₃O(CH₂)₄OH | —(CH₂)₃O(CH₂)₄OH | Do. |
| 153 | —(CH₂)₃O(CH₂)₆OH | —(CH₂)₃O(CH₂)₆OH | Do. |
| 154 | —CH(CH₃)(CH₂)₃OC(CH₃)₂OH | —CH₂CH₂OH | Do. |
| 155 | —CH(CH₃)(CH₂)₃OC(CH₃)₂OH | —(CH₂)₃OH | Do. |
| 156 | —CH(CH₃)(CH₂)₃OC(CH₃)₂OH | —CH₂CH(CH₃)OH | Do. |
| 157 | —CH(CH₃)(CH₂)₃OC(CH₃)₂OH | —(CH₂CH₂O)₂H | Do. |
| 158 | —CH(CH₃)(CH₂)₃OC(CH₃)₂OH | —(CH₂)₃O—(CH₂)₂OH | Do. |
| 159 | —CH(CH₃)(CH₂)₃OC(CH₃)₂OH | —(CH₂)₃O(CH₂)₄OH | Do. |
| 160 | —CH(CH₃)(CH₂)₃OC(CH₃)₂OH | —(CH₂)₃O(CH₂)₆OH | Do. |
| 161 | (CH₂)₃OH | —(CH₂)₃OH | 84° bis 87° C. |
| 162 | (CH₂CH₂O)₂H | —(CH₂CH₂O)₂H | Viscous oil. |
| 163 | —CH(CH₃)(CH₂)₃—C(CH₃)₂OH | —(CH₂)₂OCH₃ | Do. |
| 164 | —CH(CH₃)(CH₂)₃—C(CH₃)₂OH | —(CH₂)₃OCH₃ | Do. |
| 165 | —CH(CH₃)(CH₂)₃—C(CH₃)₂OH | —(CH₂)₃—O—C₃H₇ | Do. |
| 166 | —(CH₂CH₂O)₂H | —CH(CH₃)(CH₂)₃—C(CH₃)₂OH | Do. |
| 167 | —(CH₂)₂OH | —CH(CH₃)(CH₂)₃—C(CH₃)₂OH | Do. |
| 168 | —(CH₂)₃OH | —CH(CH₃)(CH₂)₃—C(CH₃)₂OH | Do. |
| 169 | —CH(CH₃)CH₂OH | —CH(CH₃)(CH₂)₃—C(CH₃)₂OH | Do. |
| 170 | —CH(C₃H₇)CH₂OH | —CH(CH₃)(CH₂)₃—C(CH₃)₂OH | Do. |

TABLE 3 – Continued

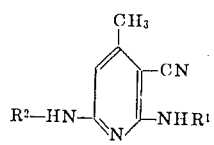

| Number | R¹ | R² | Melting point, °C. |
|---|---|---|---|
| 171 | —CH(CH₃)—CH₂OH | —CH(CH₃)—CH₂OH | Viscous oil. |
| 172 | —(CH₂)₃OH | (CH₂)₃O—(CH₂)₂OH | Do. |
| 173 | —(CH₂)₃OH | (CH₂)₃O(CH₂)₄OH | Do. |
| 174 | —(CH₂)₂OH | (CH₂)₃O—(CH₂)₆OH | Do. |
| 175 | —CH₂CH₂OH | (CH₂)₃O—(CH₂)₆OH | Do. |
| 176 | —CH₂CH₂OH | (CH₂)₃O—(CH₂)₄OH | Do. |
| 177 | —CH₂CH₂OH | (CH₂)₃O—(CH₂)₂OH | Do. |
| 178 | CH₂CH₂OCH₃ | (CH₂)₃O—(CH₂)₂OH | Do. |
| 179 | CH₂CH₂OCH₃ | (CH₂)₂O—(CH₂)₂OH | Do. |
| 180 | (CH₂)₃OCH₃ | (CH₂)₂O—(CH₂)₂OH | Do. |
| 181 | (CH₂)₃O—C₃H₇ | (CH₂)₂O—(CH₂)₂OH | Do. |
| 182 | (CH₂)₂OCH₃ | (CH₂)₃O—(CH₂)₄OH | Do. |
| 183 | (CH₂)₃OCH₃ | (CH₂)₃O—(CH₂)₄OH | Do. |
| 184 | (CH₂)₃OCH₃ | (CH₂)₃O—(CH₂)₂OH | Do. |

Shade on coupling with

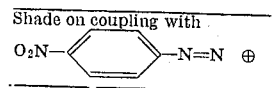

| Number | R¹ | R² | |
|---|---|---|---|
| 185 | —CH₂CH₂OCH₂CH₂OH | CH₃ | Orange. |
| 186 | —CH₂CH₂OCH₂CH₂OH | C₂H₅ | Do. |
| 187 | —CH₂CH₂OCH₂CH₂OH | C₃H₇ | Do. |
| 188 | —CH₂CH₂OCH₂CH₂OH | C₄H₉ | Do. |
| 189 | —CH₂CH₂OCH₂CH₂OH | C₅H₁₁ | Do. |
| 190 | —CH₂CH₂OCH₂CH₂OH | C₆H₁₃ | Do. |
| 191 | —CH₂CH₂OCH₂CH₂OH | CH₂CH(C₂H₅)C₄H₉(n) | Do. |
| 192 | —CH₂CH₂OCH₂CH₂OH | CH₂CH₂OH | Do. |
| 193 | —CH₂CH₂OCH₂CH₂OH | (CH₂)₃OH | Do. |
| 194 | —CH₂CH₂OCH₂CH₂OH | CH₂—CH(CH₃)OH | Do. |
| 195 | —CH₂CH₂OCH₂CH₂OH | —(CH₂)₃O(CH₂)₂OH | Do. |
| 196 | —CH₂CH₂OCH₂CH₂OH | (cyclohexyl) | Do. |
| 197 | —CH₂CH₂OCH₂CH₂OH | (cyclohexyl-H) | Do. |
| 198 | —CH₂CH₂OCH₂CH₂OH | (CH₂)₂OCH₃ | Do. |
| 199 | —CH₂CH₂OCH₂CH₂OH | (CH₂)₃OCH₃ | Do. |
| 200 | —CH₂CH₂OCH₂CH₂OH | (CH₂)₃OC₂H₅ | Do. |
| 201 | —CH₂CH₂OCH₂CH₂OH | (CH₂)₃O—C₃H₇(n) | Do. |
| 202 | —CH₂CH₂OCH₂CH₂OH | (CH₂)₃O—C₃H₇(i) | Do. |
| 203 | —CH₂CH₂OCH₂CH₂OH | (CH₂)₃O—CH₂CH(CH₃)₂ | Do. |
| 204 | —CH₂CH₂OCH₂CH₂OH | (CH₂)₃O—(cyclohexyl-H) | Do. |

| Number | R¹ | R² | Melting point, °C. |
|---|---|---|---|
| 205 | CH₂CH₂OCH₃ | CH₂CH(OH)—C₆H₅ | 116–117. |
| 206 | —CH₂—CH₂OH | CH₂CH(OH)—C₆H₅ | 188–189. |
| 207 | —CH₂—CH₂OH | H | >150. |
| 208 | (CH₂)₅—COOH | CH₂—CH(OH)—CH₃ | 185–188. |
| 209 | (CH₂)₃—O—(CH₂)₂OH | —C₂H₅ | Viscous oil. |
| 210 | (CH₂)₃—O—(CH₂)₂OH | —C₃H₇(n) | Do. |
| 211 | (CH₂)₃—O—(CH₂)₂OH | —C₄H₉(n) | Do. |

TABLE 3—Continued

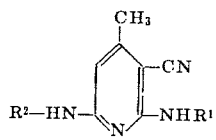

| Number | R¹ | R² | Melting point, °C. |
|---|---|---|---|
| 212 | —(CH₂)₃—O—(CH₂)₂OH | —C₅H₁₁(n) | Viscous oil. |
| 213 | —(CH₂)₃—O—(CH₂)₂OH | —C₆H₁₃(n) | Do. |
| 214 | —(CH₂)₃—O—(CH₂)₂OH | —⬡ (cyclohexyl) | Do. |
| 215 | —(CH₂)₃—O—(CH₂)₂OH | —⬡—CH₂OH | Do. |
| 216 | —(CH₂)₃—O—(CH₂)₂OH | —⟨H⟩ (phenyl) | Do. |
| 217 | —(CH₂)₃—O—(CH₂)₂OH | —⟨H⟩—OH | Do. |
| 218 | —(CH₂)₃—O—(CH₂)₂OH | —(CH₂)₃—O—⟨H⟩ | Do. |
| 219 | —(CH₂)₃—OC₂H₄—O—⟨H⟩ | —CH₂CH₂OH | Do. |
| 220 | Same as above | —(CH₂)₃OH | Do. |
| 221 | do | —(CH₂)₂O(CH₂)₂OH | Do. |
| 222 | CH₂—⟨H⟩—CH₂OH | —(CH₂)₂O(CH₂)₂OH | Do. |
| 223 | Same as above | —(CH₂)₃O(CH₂)₂OH | Do. |
| 224 | —⟨H⟩ | —(CH₂)₂O(CH₂)₂OH | Do. |
| 225 | Same as above | —(CH₂)₃O(CH₂)₂OH | Do. |
| 226 | —⟨H⟩—OH | —(CH₂)₃O(CH₂)₂OH | Do. |
| 227 | Same as above | —(CH₂)₂O(CH₂)₂OH | Do. |
| 228 | —⟨H⟩—OCH₂CH₂OH | —CH₂CH₂OH | Do. |
| 229 | Same as above | —(CH₂)₃OH | Do. |
| 230 | do | —(CH₂)₂O(CH₂)₂OH | Do. |
| 231 | —⬡ (cyclohexyl) | —(CH₂)₂O(CH₂)₂OH | Do. |
| 232 | Same as above | —(CH₂)₃O(CH₂)₂OH | Do. |
| 233 | —⬡ (bicyclic) | —(CH₂)₃O(CH₂)₂OH | Do. |
| 234 | —⬡—CH₂OH | —(CH₂)₃O(CH₂)₂OH | Do. |
| 235 | Same as above | —(CH₂)₂O(CH₂)₂OH | Do. |
| 236 | —⬡—CH₂CH₂OH | —(CH₂)₂O(CH₂)₂OH | Do. |

TABLE 3 — Continued $$\begin{array}{c} CH_3 \\ | \\ R^2-HN-\!\!\!\diagdown\!\!\!\diagup\!\!-NHR^1 \\ N \end{array} \text{ with CN substituent}$$

| Number | R¹ | R² | Melting point, °C. |
|---|---|---|---|
| 237 | -CH(CH₃)-(CH₂)₂-C₆H₃(OH)(CH₃) | -CH₂CH₂OH | Viscous oil. |
| 238 | -CH₂CH=CH₂ | -(CH₂)₂O(CH₂)₂OH | Do. |
| 239 | -CH₂CH=CH₂ | -(CH₂)₃O-(CH₂)₂OH | Do. |

Shade on coupling with
$O_2N-C_6H_4-N\!\!=\!\!N^{\oplus}$

| Number | R¹ | R² | Shade |
|---|---|---|---|
| 240 | -(CH₂)₂-N(pyrrolidinone) | -C₂H₅ | Orange. |
| 241 | Same as above | -C₃H₇(n) | Do. |
| 242 | do | -C₄H₉(n) | Do. |
| 243 | do | -C₆H₁₃(n) | Do. |
| 244 | do | -(CH₂)₃OH | Do. |
| 245 | do | -(CH₂)₂O-(CH₂)₂OH | Do. |
| 246 | do | -(CH₂)₃O(CH₂)₂OH | Do. |
| 247 | do | -(CH₂)₃O-(CH₂)₄OH | Do. |
| 248 | -(CH₂)₃-N(pyrrolidinone) | -C₂H₅ | Do. |
| 249 | Same as above | -C₃H₇(n) | Do. |
| 250 | do | -C₄H₉(n) | Do. |
| 251 | do | -C₆H₁₃(n) | Do. |
| 252 | do | -(CH₂)₂OH | Do. |
| 253 | do | -(CH₂)₃OH | Do. |
| 254 | do | -(CH₂)₂O(CH₂)₂OH | Do. |
| 255 | do | -(CH₂)₃O(CH₂)₂OH | Do. |
| 256 | do | -(CH₂)₃O(CH₂)₄OH | Do. |
| 257 | -(CH₂)₄-N(pyrrolidinone) | -C₂H₅ | Do. |
| 258 | Same as above | -C₃H₇ | Do. |
| 259 | do | -C₄H₉ | Do. |
| 260 | do | -CH₂CH₂OH | Do. |
| 261 | do | -(CH₂)₃OH | Do. |
| 262 | do | -(CH₂)₂O(CH₂)₃OH | Do. |
| 263 | do | -(CH₂)₂OCH₃ | Do. |
| 264 | do | -(CH₂)₃O(CH₂)₂OH | Do. |
| 265 | do | -(CH₂)₃O(CH₂)₄OH | Do. |
| 266 | -(CH₂)₆-N(pyrrolidinone) | C₂H₅ | Do. |
| 267 | Same as above | C₃H₇(n) | Do. |
| 268 | do | C₄H₉(n) | Do. |
| 269 | do | C₆H₁₃(n) | Do. |
| 270 | H | -(CH₂)₆-N(pyrrolidinone) | Golden yellow. |
| 271 | -(CH₂)₆-N(pyrrolidinone) | -CH₂CH₂OH | Orange. |
| 272 | Same as above | (CH₂)₃OH | Do. |
| 273 | do | (CH₂)₂O(CH₂)₂OH | Do. |
| 274 | do | (CH₂)₃O(CH₂)₂OH | Do. |
| 275 | do | (CH₂)₃O(CH₂)₄OH | Do. |
| 276 | do | (CH₂)₂OCH₃ | Do. |
| 277 | do | (CH₂)₃OCH₃ | Do. |

TABLE 3 – Continued

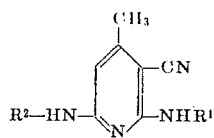

| Number | R¹ | R² | Melting point, °C. |
|---|---|---|---|
| 278 | (CH₂)₂N-pyrrolidinone | (CH₂)₃OCH₃ | Orange. |
| 279 | Same as above | (CH₂)₂OCH₃ | Do. |
| 280 | (CH₂)₃N-pyrrolidinone | (CH₂)₂OCH₃ | Do. |
| 281 | Same as above | (CH₂)₃OCH₃ | Do. |

TABLE 4

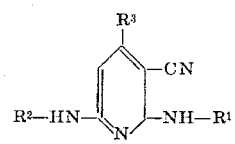

| Number | R¹ | R² | R³ | Shade coupling with $O_2N-C_6H_4-N=N^\oplus$ |
|---|---|---|---|---|
| 282 | CH₂CH₂C₆H₅ | CH₂CH₂OH | H | Orange. |
| 283 | CH₂CH₂C₆H₅ | CH₂CH₂OH | —C₂H₅ | Do. |
| 284 | CH₂CH₂C₆H₅ | (CH₂)₃OH | —C₂H₅ | Do. |
| 285 | CH₂CH₂C₆H₅ | (CH₂)₂O(CH₂)₂OH | H | Do. |
| 286 | CH₂CH₂C₆H₅ | (CH₂)₂O(CH₂)₂OH | C₂H₅ | Do. |
| 287 | CH₂CH₂C₆H₅ | CH₂CH₂OH | C₃H₇(n) | Do. |
| 288 | CH₂CH(OH)—C₆H₅ | CH₂CH₂OH | H | Do. |
| 289 | CH₂CH(OH)—C₆H₅ | CH₂CH₂OH | C₃H₇(n) | Do. |
| 290 | CH₂CH(OH)—C₆H₅ | (CH₂)₃OH | C₃H₇(n) | Do. |
| 291 | CH₂CH(OH)—C₆H₅ | (CH₂)₃OH | H | Do. |
| 292 | CH₂CH(OH)—C₆H₅ | (CH₂)₃OH | C₂H₅ | Do. |
| 293 | CH₂CH₂OH | CH₂CH₂OH | —CH(C₂H₅)C₄H₉(n) | Do. |
| 294 | CH₂CH₂OH | CH₂CH₂OH | —C₅H₁₁(n) | Do. |
| 295 | CH₂CH₂OCH₃ | (CH₂CH₂O)₂H | —C₆H₅ | Do. |
| 296 | (CH₂)₃OCH₃ | (CH₂CH₂O)₂H | —C₆H₅ | Do. |
| 297 | H | CH₂CH(OH)—C₆H₅ | H | Golden yellow. |
| 298 | H | CH₂CH(OH)—C₆H₅ | —C₃H₇(n) | Do. |
| 299 | H | (CH₂)₃O(CH₂)₄OH | H | Do. |
| 300 | H | (CH₂)₃O(CH₂)₂OH | H | Do. |

TABLE 5

$$\underset{R^2-HN-\overset{\underset{|}{CH_3}}{\underset{}{\bigcirc}}-NH-R^1}{-SO_2NH_2}$$

| Number | $R^1$ | $R^2$ | Shade after coupling with $O_2N-\bigcirc-N=N\ \oplus$ |
|---|---|---|---|
| 301 | $-CH_2-CH_2CH_2OCH_3$ | $-(CH_2)_3OH$ | Red. |
| 302 | $-CH_2CH_2-C_6H_5$ | $-CH_2CH_2OH$ | Red. |
| 303 | $-CH_2CH_2-C_6H_5$ | $-(CH_2)_3OH$ | Red. |
| 304 | $-CH_2-CH(OH)-C_6H_5$ | $-(CH_2)_2OH$ | Red. |
| 305 | $-CH_2-CH(OH)-C_6H_5$ | $-(CH_2)_2OH$ | Red. |
| 306 | $-(CH_2)_3O-CH_2C_6H_5$ | $-(CH_2)_2OH$ | Red. |
| 307 | $-(CH_2)_3O-CH_2C_6H_5$ | $-(CH_2)_3OH$ | Red. |
| 308 | $-(CH_2)_3OCH_2CH_2O-C_6H_5$ | $-(CH_2)_3OH$ | Red. |
| 309 | $-(CH_2)_3OCH_2CH_2O-C_6H_5$ | $-(CH_2)_2OH$ | Red. |
| 310 | $-(CH_2)_2O(CH_2)_2OH$ | $-(CH_2)_2OCH_3$ | Red. |
| 311 | $-(CH_2)_2O(CH_2)_2OH$ | $-(CH_2)_3OCH_3$ | Red. |
| 312 | $-(CH_2)_2OCH_3$ | $-(CH_2)_2O(CH_2)_2OH$ | Red. |
| 313 | $-(CH_2)_3OCH_3$ | $-(CH_2)_2O(CH_2)_2OH$ | Red. |
| 314 | $-H$ | $-(CH_2)_2O(CH_2)_2OH$ | Yellowish red. |
| 315 | $-H$ | $-(CH_2)_3O(CH_2)_2OH$ | Do. |
| 316 | $-H$ | $-(CH_2)_3O(CH_2)_4OH$ | Do. |
| 317 | $-CH_2-CH_2OH$ | $-CH_2CH_2-C_6H_5$ | Red. |
| 318 | $-(CH_2)_3OH$ | $-CH_2CH_2-C_6H_5$ | Red. |
| 319 | $-(CH_2)_3OCH_3$ | $-CH_2CH_2-C_6H_5$ | Red. |
| 320 | $-CH_2-CH_2-C_6H_5$ | $-(CH_2)_3OCH_3$ | Red. |
| 321 | $-CH(CH_3)(CH_2)_3C(CH_3)_2(OH)$ | $-CH_2CH_2OH$ | Red. |
| 322 | $-CH(CH_3)(CH_2)_3C(CH_3)_2(OH)$ | $-(CH_2)_3OH$ | Red. |
| 323 | $-CH(CH_3)(CH_2)_3C(CH_3)_2(OH)$ | $-(CH_2)_2O(CH_2)_2OH$ | Red. |
| 324 | cyclohexyl | $-CH_2-CH_2OH$ | Red. |
| 325 | Same as above | $-(CH_2)_3OH$ | Red. |
| 326 | do | $-(CH_2)_2O(CH_2)_2OH$ | Red. |
| 327 | do | $-(CH_2)_3-O-(CH_2)_2OH$ | Red. |
| 328 | $-C_4H_9(n)$ | $-(CH_2)_3-O-(CH_2)_2OH$ | Red. |
| 329 | $-C_4H_9(n)$ | $-(CH_2)_2O(CH_2)_2OH$ | Red. |
| 330 | $-(CH_2)_2O(CH_2)_2OH$ | $-C_4H_9(n)$ | Red. |
| 331 | $-(CH_2)_2O(CH_2)_2OH$ | cyclohexyl | Red. |
| 332 | cyclohexyl | $-(CH_2)_2O(CH_2)_2OH$ | Red. |
| 333 | $-(CH_2)_2-(2\text{-oxopyrrolidin-1-yl})$ | $-(CH_2)_3OH$ | Red. |
| 334 | $-(CH_2)_6-(2\text{-oxopyrrolidin-1-yl})$ | $-(CH_2)_3OH$ | Red. |
| 335 | $H$ | $-(CH_2)_2OH$ | Red. |
| 336 | phenyl | $-(CH_2)_2OH$ | Bluish red. |
| 337 | Same as above | $-(CH_2)_3OH$ | Do. |
| 338 | do | $-(CH_2)_2O(CH_2)_2OH$ | Do. |
| 339 | $o$-tolyl (CH$_3$-phenyl) | $-(CH_2)_2O(CH_2)_2OH$ | Do. |

TABLE 5—Continued

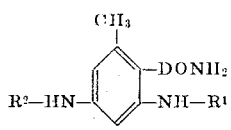

| Number | R¹ | R² | Shade after coupling with $O_2N-\langle\rangle-N=N$ ⊕ |
|---|---|---|---|
| 340 | $-(CH_2)_2OH$ | $-(CH_2)_2OH$ | Red. |
| 341 | $-(CH_2)_3OH$ | $-(CH_2)_3OH$ | Red. |
| 342 | $-(CH_2)_3O(CH_2)_4OH$ | $-(CH_2)_3OH$ | Red. |
| 343 | $-(CH_2)_3O(CH_2)_2OH$ | $-(CH_2)_2OCH_3$ | Red. |
| 344 | $-(CH_2)_3O(CH_2)_2OH$ | $-(CH_2)_3OCH_3$ | Red. |
| 345 | $-(CH_2)_3O-(CH_2)_4OH$ | $-(CH_2)_3OCH_3$ | Red. |
| 346 | $-H$ | $-(CH_2)_2O(CH_2)_2OH$ | Yellowish red. |
| 347 | $-\langle H\rangle-OH$ | $-CH_2-CH_2-OH$ | Red. |
| 348 | Same as above | $-(CH_2)_3OH$ | Red. |
| 349 | do | $-(CH_2)_2O-(CH_2)_2OH$ | Red. |
| 350 | $-(CH_2)_3O-\langle H\rangle$ | $-(CH_2)_2O-(CH_2)_2OH$ | Red. |
| 351 | Same as above | $-(CH_2)_2OH$ | Red. |
| 352 | do | $-(CH_2)_3OH$ | Red. |
| 353 | $-CH_2-CH-C_6H_5$ <br> $\vert$ <br> $CH_3$ | $-(CH_2)_3OH$ | Red. |
| 354 | $-CH_2-CH-C_6H_5$ <br> $\vert$ <br> $CH_3$ | $-(CH_2)_2OH$ | Red. |
| 355 | $-CH_2-CH-C_6H_5$ <br> $\vert$ <br> $CH_3$ | $-(CH_2)_3-O-(CH_2)_2OH$ | Red. |
| 356 | $-CH_2-CH-O-C_6H_5$ <br> $\vert$ <br> $CH_3$ | $-CH_2-CH_2-OH$ | Red. |

The Examples described in the above Tables are prepared by always first introducing the radical R¹.

EXAMPLE 357

25 parts of the coupling component of the formula:

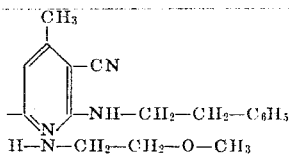

is stirred with 75 parts of 90 percent sulphuric acid for six to eight hours at 80° to 100°C. The reaction mixture is then precipitated on 500 parts of ice, adjusted to pH 4 to 6 by adding caustic soda solution and extracted with ethyl acetate. After the extractant has been evaporated about 20 parts of the coupling component of the formula:

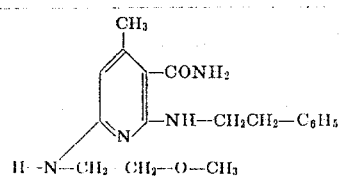

is obtained as a dark oil. A red dye is obtained therefrom after coupling with diazotized p-nitroaniline Example 358

30 parts of 2,6-diamino-3-cyano-4-methylpyridine is stirred with 200 parts by volume of concentrated sulphuric acid for ten hours at 50°C. The whole is then allowed to cool, 250 parts of ice is added and it is left overnight. The deposited precipitate is filtered off and washed witht acetone. After drying, 36 parts of a colourless powder of the formula:

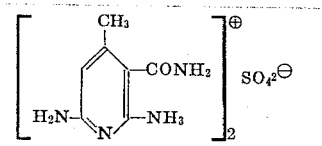

is obtained which melts at 250°C with decomposition.

The free base of the formula:

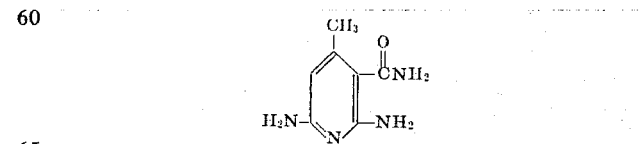

is obtained from the salt by a conventional method.

TABLE 6

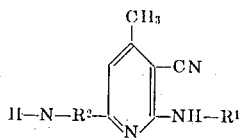

| Number | R¹ | R² | Melting point, °C |
|---|---|---|---|
| 359 | —C₆H₅ | —C₆H₅ | 128–130 |
| 360 | —C₆H₄—CH₃ | —C₆H₄—CH₃ | 178 |
| 361 | —CH₃ | —CH₃ | 140–150 |
| 362 | —CH(CH₃)₂ | —CH(CH₃)₂ | 118–120 |
| 363 | —C₃H₇(n) | —C₃H₇(n) | 122–123 |
| 364 | —CH₂—CH=CH₂ | —CH₂—CH=CH₂ | 77 |
| 365 | —C₄H₉(n) | —C₄H₉(n) | 97 |
| 366 | —C₆H₁₃(n) | —C₆H₁₃(n) | Oil |
| 367 | —C₆H₁₁ (cyclohexyl) | —C₆H₁₁ (cyclohexyl) | 193 |
| 368 | —H | —H | 225 |
| 369 | —C₆H₄—Cl | —C₆H₄—Cl | 175 |
| 370 | —CH₂—C₆H₅ | —CH₂—C₆H₅ | 170 |
| 371 | —CH₂—CH₂—C₆H₅ | —CH₂—CH₂—C₆H₅ | 110 |
| 372 | —C₂H₅ | —C₂H₅ | ¹ 205 |
| 373 | —C₆H₅ | —C₄H₉(n) | 115 |
| 374 | C₆H₅ | H | (²) |
| 375 | C₄H₉(n) | H | 100 |
| 376 | C₂H₅ | —C₆H₅ | 218–220 |
| 377 | —CH₂CH₂C₆H₅ | —H | 100 |
| 378 | —CH₂—CH(CH₃)—C₆H₅ | —CH₂—CH(CH₃)—C₆H₅ | Ca. 60 |
| 379 | —H | —CH₂—CH₂—C₆H₅ | Ca. 100, ¹ 188 |
| 380 | —C₈H₁₇(n) | —H | Oil |
| 381 | —C₁₁H₂₉ | —H | Ca. 90–105 |
| 382 | —H | —CH₂—CH(CH₃)—C₆H₅ | Tar |
| 383 | —CH₂—CH(CH₃)—C₆H₅ | —H | Tar |
| 384 | —CH₂—CH₂—CN | —CH₂—CH₂—CN | 170–176 |
| 385 | —CH₂—CH₂—CN | —CH₂—CH₂—C₆H₅ | Ca. 120 |
| 386 | —H | —(CH₂)₃CN | 142 |

¹ Hydrochloride.
² Tarry: becomes solid after prolonged standing.

EXAMPLE 398

190 parts of 2,6-dichloro-3-cyano-4-methylpyridine, 750 parts of isopropanol and approx. 300 parts of ammonia are stirred in an autoclave for 15 hours at 180°C. The mixture is allowed to cool, excess ammonia is evaporated and 450 parts by volume of isopropanol is distilled off. The residue is mixed with approx. 600 parts of water, the pH is adjusted to approx. 0 with concentrated hydrochloric acid and the solution filtered. Then 50 percent caustic soda solution is added until the pH of the mixture is approx. 9, the mixture allowed to cool to 0°–10°C and then filtered, and the residue is washed with water and dried. 130 to 145 parts of a colorless powder of the formula

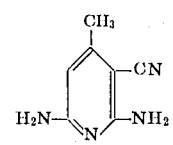

is obtained which melts at 225°C.

EXAMPLE 399

300 parts of 2,6-dichloro-3-cyano-4-methylpyridine is mixed with about 500 parts by volume of liquid ammonia and treated in an autoclave for 2 hours at approx. 80°C. Excess ammonia is allowed to evaporate, the residue is diluted with approx. 2500 parts by volume of water, and the pH is adjusted to 0 to 1 with hydrochloric acid. The insoluble residue is filtered off, washed with water and dried. Approx. 260 parts of a colorless powder of the formula

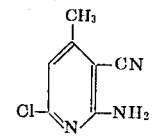

TABLE 7

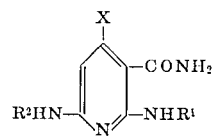

| Example | X | R¹ | R² | Shade when coupled with O₂N—C₆H₄—N₂⊕ |
|---|---|---|---|---|
| 387 | CH₃ | H | CH₂CH₂OH | Yellowish red. |
| 388 | CH₃ | H | (CH₂)₃OH | Do. |
| 389 | CH₃ | H | CH₂—CH(OH)—C₆H₅ | Do. |
| 390 | CH₃ | H | CH₂CH₂C₆H₅ | Do. |
| 391 | C₃H₇ | C₆H₅ | CH₂CH₂OH | Bluish red. |
| 392 | C₃H₇ | C₆H₅ | (CH₂)₃OH | Do. |
| 393 | C₃H₇ | C₆H₅ | (CH₂)₂O(CH₂)₂OH | Do. |
| 394 | C₃H₇ | C₆H₄—CH₃ | (CH₂)₂O(CH₂)₂OH | Do. |
| 395 | C₃H₇ | Same as above | CH₂CH₂OH | Do. |
| 396 | C₃H₇ | do | (CH₂)₃OH | Do. |
| 397 | H | C₆H₅ | (CH₂)₃OH | Do. | which contains a minor amount of the isomeric 2-chloro-3-cyano-4-methyl-6-aminopyridine and melts at 210°C is obtained.

168 parts of this powder is mixed with about 170 parts of β-hydroxyethylamine and 170 parts by volume of isopropanol. The mixture is heated for 7 to 10 hours under reflux, the solvent is distilled off, the residue is diluted with about 400 parts of water, and the pH is adjusted to 1 to 2. A deep-colored solution of about 192 parts of the coupling component of the formula

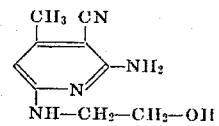

is obtained, a minor portion of which consists of 2-amino-4-methyl-5-cyano-6-β-hydroxyethylaminopyridine.

A greenish yellow dye may be obtained by coupling with diazotized 2-aminobenzonitrile.

TABLE 8

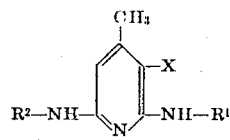

| No. | R¹ | R² | X | Shade when coupled with $O_2N-C_6H_4-N=N^{\oplus}$ |
|---|---|---|---|---|
| 400 | H | CH₃ | CN | Golden yellow. |
| 401 | H | C₂H₅ | CN | Do. |
| 402 | H | C₃H₇ | CN | Do. |
| 403 | H | C₂H₄OCH₃ | CN | Do. |
| 404 | H | C₂H₄OCH₃ | CONH₂ | Yellowish red. |
| 405 | H | C₃H₆OCH₃ | CONH₂ | Do. |
| 406 | H | C₃H₆OCH₃ | CN | Golden yellow. |
| 407 | H | C₄H₉(n) | CN | Yellow orange. |
| 408 | H | C₄H₉(n) | CONH₂ | Yellowish red. |
| 409 | H | CH₂CH=CH₂ | CN | Golden yellow. |
| 410 | H | (CH₂)₆N-pyrrolidinone | CONH₂ | Yellowish red. |
| 411 | H | CH₃–CH(CH₂)₃C(CH₃)₂–OH | CN | Orange. |
| 412 | H | CH₃–CH(CH₂)₃C(CH₃)₂–OH | CONH₂ | Red. |
| 413 | CH₃–CH(CH₂)₃C(CH₃)₂–OH | CH₂CH₂OH | CONH₂ | Red. |
| 414 | CH₃–CH(CH₂)₃C(CH₃)₂–OH | (CH₂)₃OH | CONH₂ | Red. |
| 415 | CH₂CH₂OH | (CH₂)₆N-pyrrolidinone | CONH₂ | Red. |
| 416 | –C₆H₄–Cl | CH₂CH₂OH | CONH₂ | Red. (M.P.: 150–153° C.) |

We claim:
1. A compound of the formula

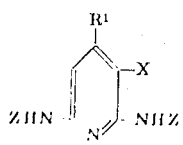

in which:
R¹ is hydrogen, alkyl of one to seven carbon atoms or phenyl;
X is cyano or carbamoyl; and
each Z, independently of one another, is hydrogen, alkyl of one to eight carbon atoms, hydroxyalkyl of two to eight carbon atoms, cyanoalkyl of two to seven carbon atoms, alkoxyalkyl of two or three carbon atoms in the alkyl and one to eight carbon atoms in the alkoxy, cyclohexoxypropyl, benzyloxypropyl, β-phenyl-ethoxypropyl, phenoxypropyl, tolyloxypropyl, cyclopentyl, cyclohexyl, cycloheptyl, cyclooctyl, hydroxycyclohexyl, β-hydroxyethoxycyclohexyl, norbornyl, hydroxynorbornyl, hydroxymethylnorbornyl, chloromethylnorbornyl, β-hydroxyethylnorbornyl, bicyclooctyl, phenylalkyl or tolylalkyl of one to four carbon atoms in the alkyl, phenyl, phenyl substituted by methyl, methoxy, ethoxy, hydroxy, chloro or β-hydroxyethoxy, allyl, carboxyethyl, carboxypentyl, ω-pyrrolidonylalkyl of two to six carbon atoms in the alkyl,

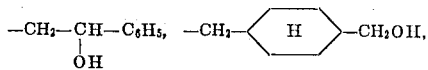

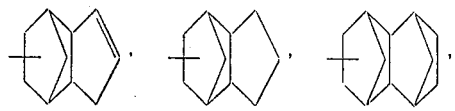

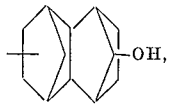

—(CH₂)₂O(CH₂)₂OH, —(CH₂)₃O(CH₂)₄OH, —(CH₂)₃O(CH₂)₆OH,

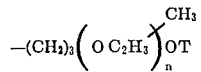

or —(CH₂)₃(OC₂H₄)ₙOT,
n being 1, 2, 3 or 4, and
T being hydrogen, alkyl of one to four carbon atoms, benzyl, phenylethyl, cyclohexyl, phenyl or tolyl.

2. A compound as claimed in claim 1 of the formula

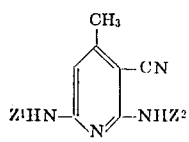

in which:
Z¹ is an oxygen-containing radical selected from the group consisting of
—CH₂CH₂OH, —CH₂CH₂CH₂OH,

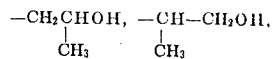

—(CH₂)₃O(CH₂)₂OH, —(CH₂)₃O(CH₂)₄OH,
—(CH₂)₃O(CH₂)₆OH,
—(CH₂)₄OH, —(CH₂)₆OH, —(CH₂)₂O(CH₂)₂OH,

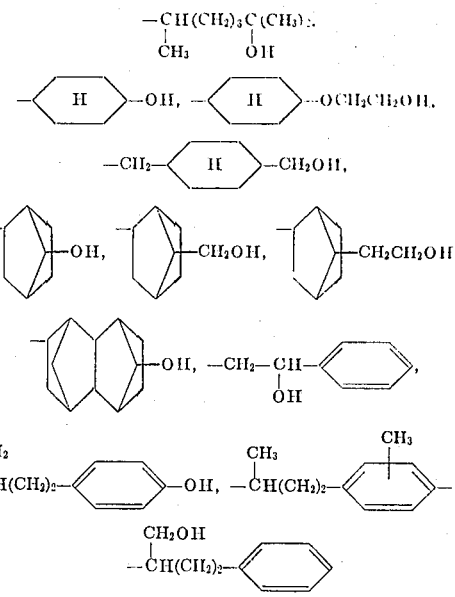

—CH₂CH₂OCH₃, —CH₂CH₂OC₂H₅, —CH₂CH₂OC₄H₉,
—(CH₂)₃OCH₃, —(CH₂)₃OC₂H₅, —(CH₂)₃OC₄H₉,
—(CH₂)₃OC₃H₇,
—(CH₂)₃OC₆H₁₃, —(CH₂)₃OC₈H₁₇,

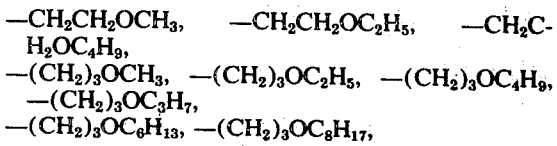

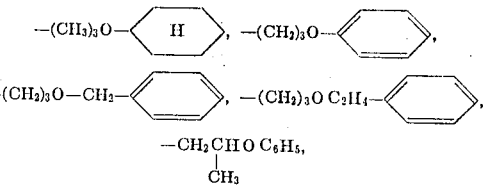

—(CH₂)₃OC₂H₄OCH₃,
—(CH₂)₃OC₂H₄OC₄H₉,

and
—(CH₂)₃OC₂H₄OC₆H₅;
and
Z² is hydrogen, an oxygen-containing radical as defined for Z¹ or an oxygen-free radical selected from the group consisting of
—C₂H₅, —C₃H₇, —C₄H₉,

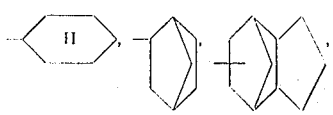

—CH₂C₆H₅, —C₂H₄C₆H₅, —C₃H₇C₆H₅,

—CH$_2$—CH—C$_6$H$_5$,
         |
         CH$_3$
—C$_6$H$_5$, —C$_6$H$_4$CH$_3$ and —C$_6$H$_4$OCH$_3$.
3. The compound of the formula
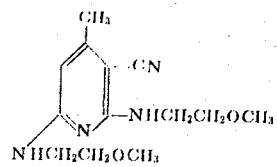
4. The compound of the formula
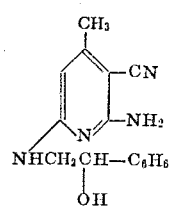
5. The compound of the formula
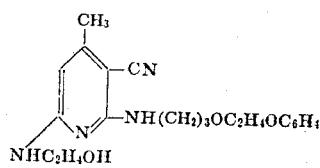
6. The compound of the formula
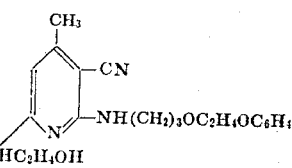
* * * * *